United States Patent
Jenkins

(10) Patent No.: US 10,960,570 B2
(45) Date of Patent: Mar. 30, 2021

(54) ADDITIVES FOR LIGNOCELLULOSIC COMPOSITES

(71) Applicant: Hexion Inc., Columbus, OH (US)

(72) Inventor: Donald G. Jenkins, Lufkin, TX (US)

(73) Assignee: HEXION INC., Columbus, OH (US)

( * ) Notice: Subject to any disclaimer, the term of this patent is extended or adjusted under 35 U.S.C. 154(b) by 47 days.

(21) Appl. No.: 15/909,375

(22) Filed: Mar. 1, 2018

(65) Prior Publication Data

US 2019/0270219 A1    Sep. 5, 2019

(51) Int. Cl.
| | |
|---|---|
| B27K 3/00 | (2006.01) |
| B27K 3/50 | (2006.01) |
| B27N 1/00 | (2006.01) |
| B27K 3/36 | (2006.01) |
| B27K 3/52 | (2006.01) |
| C08L 91/00 | (2006.01) |
| B27K 3/15 | (2006.01) |

(52) U.S. Cl.
CPC .......... *B27K 3/50* (2013.01); *B27K 3/15* (2013.01); *B27K 3/36* (2013.01); *B27K 3/52* (2013.01); *B27N 1/006* (2013.01); *C08L 91/00* (2013.01); *B27K 2200/10* (2013.01); *B27K 2240/70* (2013.01)

(58) Field of Classification Search
None
See application file for complete search history.

(56) References Cited

U.S. PATENT DOCUMENTS

| | | | | |
|---|---|---|---|---|
| 3,607,351 A | * | 9/1971 | Lee ................... | C23C 18/2086 427/306 |
| 4,472,550 A | * | 9/1984 | Reiff .................. | C08G 18/288 524/589 |
| 5,043,438 A | * | 8/1991 | Buter .................. | C07H 13/06 536/119 |
| 5,908,496 A | * | 6/1999 | Singule ............... | C08G 18/6492 106/271 |
| 5,961,783 A | * | 10/1999 | Payton ................ | C08G 18/6283 162/158 |
| 6,121,440 A | * | 9/2000 | Kenneally ............ | C07H 13/06 536/115 |
| 6,146,696 A | | 11/2000 | Das et al. | |
| 6,268,322 B1 | | 7/2001 | St. Lewis et al. | |
| 6,706,877 B1 | * | 3/2004 | Claverie .............. | C07H 13/06 536/119 |
| 8,071,209 B2 | | 12/2011 | Theberge et al. | |
| 8,968,870 B2 | | 3/2015 | Sinnige | |
| 9,062,160 B1 | * | 6/2015 | Chan ................... | C08G 71/04 |
| 2003/0015122 A1 | * | 1/2003 | Moriarty ............. | C08L 91/06 106/268 |
| 2005/0269728 A1 | * | 12/2005 | Roos .................. | B27N 1/00 264/109 |
| 2011/0189473 A1 | * | 8/2011 | Mente ................. | C08L 97/02 428/326 |
| 2011/0207850 A1 | | 8/2011 | Kan et al. | |
| 2013/0030067 A1 | * | 1/2013 | Mooney .............. | C08G 18/7671 521/107 |
| 2013/0245164 A1 | * | 9/2013 | Limerkens ........... | C03C 25/32 524/72 |
| 2016/0090508 A1 | | 3/2016 | Sworen et al. | |
| 2016/0096916 A1 | * | 4/2016 | Webster .............. | C08L 63/00 522/170 |

FOREIGN PATENT DOCUMENTS

| | | | | |
|---|---|---|---|---|
| WO | WO-9914422 A1 | * | 3/1999 | .......... D06M 15/572 |
| WO | WO2003/049847 | | 6/2003 | |
| WO | WO 2009/046521 | | 4/2009 | |
| WO | WO2014/098072 | | 6/2014 | |

OTHER PUBLICATIONS

Prior_Art_Web_Search_Printable_History_Generator (Year: 2020).*
Prior_Art_Web_Search_Printable_History_Generator-2 (Year: 2020).*

* cited by examiner

*Primary Examiner* — Stefanie J Cohen

(57) ABSTRACT

An additive formulation for lignocellulosic composites comprising a) a first aqueous emulsion comprising i) a component selected from the group consisting of petroleum wax, a triglyceride, and combinations thereof; and ii) a first anionic emulsifier; and b) a second aqueous emulsion comprising: i) a reaction product of I) a derivative of a polyol selected from the group consisting of saccharides, sugar alcohols, sugar acids, gluconic acids, and gluconic acid lactones; and II) a polyisocyanate; and ii) an emulsifier selected from the group consisting of a second anionic emulsifier, a non-ionic emulsifier, and mixtures thereof, is disclosed.

9 Claims, No Drawings

ADDITIVES FOR LIGNOCELLULOSIC COMPOSITES

FIELD OF THE INVENTION

The present invention relates to aqueous emulsion additives useful for lignocellulosic composites.

BACKGROUND OF THE INVENTION

Lignocellulosic composites include a number of products made by the panel board industry, such as for example plywood, oriented strand board (OSB, also referred to as flake or wafer board), medium density fiber board (MDF), high density fiberboard, chipboard, laminated veneer lumber, particleboard, and the like. Such composites are formed from wood chips, wood particles and/or fibers, an adhesive binder, and optionally fillers, additives, and/or processing aids. The wood is generally mixed or treated with the binder and the additives and/or fillers, and pressed into the desired shape, i.e., boards, using a specified compacting pressure at a specified temperature range.

In both lignocellulosic composites and lumber (the wood of trees cut and prepared for use as building material) (collectively referred to herein as "lignocellulosic products") it is desirable to control water absorption, which leads to swelling and/or shrinkage. Such dimensional instability has a detrimental effect on the utility of the product. For example, in plywood used for floor underlay, swelling causes buckling or creep in the final wood or tile overlay. Water absorption can also increase the rate of biological degradation of the product.

Waxes have been used to impart water-resistant properties to lignocellulosic products. Waxes are commonly incorporated into composites by addition to the binder, usually in the form of an emulsion. Waxes can also be used to impregnate wood, again when in the form of an emulsion. However, due to increased difficulty in sourcing wax streams and increased environmental awareness, efforts have been made to source alternative raw materials. Such materials include bio-based oils and triglycerides which can be used either alone or in combination with slack waxes as concentrates or emulsions. However, this can result in performance and product stability gaps, especially with shear and cold stability.

Therefore, a wax emulsion formulation containing bio-based oils or triglycerides that do not have these negative properties would be desirable.

SUMMARY OF THE INVENTION

In one broad embodiment of the present invention, there is disclosed a formulation comprising, consisting of, or consisting essentially of: a) a first aqueous emulsion comprising i) a component selected from the group consisting of petroleum wax, a triglyceride, and combinations thereof; and ii) a first anionic emulsifier; and b) a second aqueous emulsion comprising: i) a reaction product of I) a derivative of a polyol selected from the group consisting of saccharides, sugar alcohols, sugar acids, gluconic acids, and gluconic acid lactones; and II) a polyisocyanate; and ii) an emulsifier selected from the group consisting of a second anionic emulsifier, a non-ionic emulsifier, and mixtures thereof.

In another embodiment of the invention, there is disclosed a method for preparing composite panels comprising, consisting of, or consisting essentially of introducing an additive into a composite panel, wherein the additive comprises an aqueous emulsion comprising a reaction product of a derivative of a polyol selected from the group consisting of saccharides, sugar alcohols, sugar acids, gluconic acids, and gluconic acid lactones and a polyisocyanate; and an emulsifier selected from the group consisting of an anionic emulsifier, a nonionic emulsifier, and mixtures thereof. The additive can further comprise an aqueous emulsion comprising a component selected from the group consisting of petroleum wax, a triglyceride, and combinations thereof; and an anionic emulsifier.

DETAILED DESCRIPTION OF THE INVENTION

In one embodiment of the present invention, there is disclosed a formulation comprising: a) a first aqueous emulsion comprising i) a component selected from the group consisting of petroleum wax, a triglyceride, and combinations thereof; and ii) a first anionic emulsifier; and b) a second aqueous emulsion comprising i) a reaction product of I) a derivative of a polyol selected from the group consisting of saccharides, sugar alcohols, sugar acids, gluconic acids, and gluconic acid lactones; and II) a polyisocyanate; and ii) an emulsifier selected from the group consisting of a second anionic emulsifier, a nonionic emulsifier, and mixtures thereof.

A triglyceride is defined as an ester derived from glycerol and three carboxylic acids having aliphatic chains with an even number of 4 to 28 carbon atoms per molecule. Carboxylic acids having aliphatic chains with an even number of 4 to 28 carbon atoms per molecule are commonly known as fatty acids. Triglycerides often are formed from fatty acids with 16 or 18 carbon molecules per aliphatic chain. Triglycerides that are useful in the present invention can be vegetable oils. The vegetable oils can be partially or fully hydrogenated, or can be used without hydrogenation. Examples of vegetable oils include, but are not limited to soybean oil, rapeseed oil, sunflower oil, canola oil, safflower oil, menhaden oil, corn oil, olive oil, cacao oil, linseed oil, cottonseed oil, peanut oil, palm oil, jatropha oil, algal oil, castor oil, coconut oil, and mixtures thereof.

In various embodiments, the triglycerides that can be used are animal-based oils such as tallow, fish oil, chicken fat, yellow grease, lard, butter, and mixtures thereof. The animal-based oils can also be partially or fully hydrogenated, or can be used without hydrogenation. Combinations of animal and vegetable oils can also be used.

As used herein, "wax" refers to hydrophobic materials having a solid state at room temperature (i.e., a melting point and a softening point above 30° C.), such as certain hydrocarbon materials having long chain aliphatic (fatty) oxygen-containing moieties, and, optionally, fatty ester, alcohol, acid, amide or amine, or alkyl acid phosphate groups.

The petroleum wax can be any petroleum wax suited for lignocellulosic products. In various embodiments, the petroleum wax is a slack wax. A slack wax is a mixture of oil and wax which is the byproduct from the refining of lubricating oil. Slack waxes useful in the invention can have an average chain length of from 26 to 44 carbon atoms. A petroleum wax typically has a melting point of from 110° F. (43.3° C.) to 155° F. (68° C.).

Anionic emulsifiers include, but are not limited to stearic acid, sodium lauryl sulfate, ammonium lauryl sulfate, sodium laureth sulfate, sodium myreth sulfate, sodium stearate, sodium lauryl sarcosinate, perfluorononanoate, perfluorooctanoate, and combinations thereof.

The triglyceride and slack wax can typically be present in a weight ratio in the range of from 9:1 to 1:9. Any and all weight ratios between 9:1 and 1:9 are included herein and disclosed herein, for example, the triglyceride and slack wax can be present in a weight ratio in the range of from 6:1 to 1:6 or from 4:1 to 1:4. In various embodiments, the triglyceride and slack wax are present in a weight ratio of 1:1.

The first emulsion can be prepared by any method known to those skilled in the art. In various embodiments, the components of the emulsion can be heated in a vessel and agitated using a suitable means of agitation. In other embodiments, the contents of the vessel are circulated through a homogenizer. In various other embodiments, the contents are agitated using a high speed mixer.

The first emulsion is generally present in the formulation in a range of from 90 weight percent to 99.95 weight percent. Any and all weight percent ranges between 90 weight percent and 99.95 weight percent are included herein and disclosed herein; for example, the first emulsion can be present in the formulation in a range of from 92 to 98 weight percent, from 94 to 98 weight percent, or from 95 to 97 weight percent.

The second emulsion comprises a reaction product of a polyisocyanate and an isocyanate reactive compound comprising at least one derivative of a polyol selected from the group consisting of saccharides, sugar alcohols, sugar acids, gluconic acids, and gluconic acid lactones. The derivative is an esterification product of the polyol and a fatty acid.

Examples of polyols that can be used include, but are not limited to saccharides such as glucose, glyceraldehyde, erythrose, arabinose, ribose, allose, altrose, mannose, xylose, lyxose, gulose, glactose, talose, fructose, ribulose, mannoheptulose, sedoheptulose, threose, erythritol, threitol, glucopyranose, mannopyranose, talopyranose, allopyranose, altropyranose, idopyranose, gulopyranose, sugar alcohols such as glucitol, mannitol, sorbitol, arabitol, xylitol, ribitol, galactitol, fucitol, iditol, inositol, pentaerythritol, dipentaerythritol, and volemitol, sugar acids such as glyceric acid, galactaric acid, ascorbic acid, citric acid, aldonic acids such as xylonic acid and gluconic acid, aldonic acid lactones such as gluconic acid lactone, glyceric acid lactone, xylonic acid lactone, and amino sugars such as glucosamine, galactosamine, and combinations thereof.

In various embodiments, the polyol is esterified with a fatty acid to form the derivative. Fatty acids that can be used include, but are not limited to caprylic acid, capric acid, lauric acid, mysteric acid, palmitic acid, stearic acid, arachidic acid, behenic acid, lignoceric acid, palmitoleic acid, lineolic acid, oleic acid, erucic acid, and combinations thereof.

Examples of polyisocyanates that can be used include, but are not limited to m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate, 4,4',4"-triphenyl methane triisocyanate, a polymethylene polyphenylisocyanate, polymeric diphenylmethane diisocyanate (PMDI), isophorone diisocyanate, toluene-2,4,6-triisocyanate and 4,4'-dimethyldiphenylmethane-2,2',5,5'-tetraisocyanate. In various embodiments, the polyisocyanate is diphenylmethane-4,4'-diisocyanate, diphenylmethane-2,4-diisocyanate, hexamethylene-1,6-diisocyanate, isophorone diisocyanate, toluene-2,4-diisocyanate, toluene-2,6-diisocyanate or mixtures thereof. Diphenylmethane-4,4'-diisocyanate, diphenylmethane-2,4-diisocyanate and mixtures thereof are generically referred to as MDI and all can be used. Toluene-2,4-diisocyanate, toluene-2,6-diisocyanate and mixtures thereof are generically referred to as TDI and all can be used.

In various embodiments, the polyisocyanate can be a blocked isocyanate, where a standard polyisocyanate is prereacted with a blocking agent containing active hydrogen groups, which can then be deblocked at temperatures greater than 40° C. (typically in the range of from 100° C. to 190° C.). Examples of blocking agents include, but are not limited to γ-caprolactam, phenol, methyl ketone oxime, 1,2,4-triazole, and dimethyl malonate.

The second emulsion also includes an emulsifier selected from the group consisting of a second anionic emulsifier, a nonionic emulsifier, and mixtures thereof Examples of anionic emulsifiers are described above. Examples of nonionic emulsifiers include, but are not limited to fatty alcohol ethoxylates, alkylphenol ethoxylates, fatty acid ethoxylates, ethoxylated fatty esters, ethoxylated amines, fatty acid amines, terminally blocked ethoxylates, fatty acid esters of polyhydroxy compounds, fatty acid esters of sorbitol, fatty acid esters of glycerol, fatty acid esters of sucrose, alkyl polyglucosides, amine oxides, sulfoxides, and phosphine oxides.

The second emulsion is typically prepared by reacting a polyol derivative with a polyisocyanate. In various embodiments, this reaction can take place in a solvent. After the reaction is complete, water is added to the reaction product along with emulsifiers and the mixture is stirred. The mixture is then homogenized to form an emulsion.

The polyol derivative and polyisocyanate are generally present in a molar ratio of from 1:1 to 4:1. Any and all ratios between 1:1 and 4:1 are included herein and disclosed herein; for example, the polyol derivative and polyisocyanate can be present in a molar ratio in the range of from 1.25:1 to 3.5:1, or from 1.5:1 to 2.5:1.

The second emulsion is generally present in the formulation in a range of from 0.05 weight percent to 10 weight percent. Any and all weight percent ranges between 0.05 weight percent and 10 weight percent are included herein and disclosed herein; for example, the second emulsion can be present in the formulation in a range of from 0.1 to 7 weight percent, from 0.5 to 4 weight percent, or from 0.75 to 1.5 weight percent.

Optionally, the formulation can include biocides, flow processers, fluoro surfactants, blocked isocyanates, fluoro polymers, ethoxylated silicones, and maleic anhydride derivatives.

Also disclosed herein is a method for preparing composite panels. This method comprises introducing an additive into a composite panel, wherein the additive comprises an aqueous emulsion comprising a reaction product of a polyol derivative and a polyisocyanate; and a mixture of an emulsifier selected from the group consisting of an anionic emulsifier, a nonionic emulsifier, and mixtures thereof.

The aqueous emulsion utilized in this method comprises a reaction product of a polyol derivative and polyisocyanate, and an emulsifier selected from the group consisting of an anionic emulsifier, a nonionic emulsifier, and mixtures thereof, is described above.

In various embodiments, the additive can be a formulation comprising: a) a first aqueous emulsion comprising i) a component selected from the group consisting of petroleum wax, a triglyceride, and combinations thereof; and ii) an anionic emulsifier; and b) a second aqueous emulsion comprising i) a reaction product of a polyol derivative and ii) a polyisocyanate; and an emulsifier selected from the group consisting of a second anionic emulsifier, a nonionic emulsifier, and mixtures thereof. This formulation is described above.

In various embodiments where the formulation comprising a first aqueous emulsion and a second aqueous emulsion is used, the first aqueous emulsion is generally present in the formulation in a range of from 90 weight percent to 99.95 weight percent. Any and all weight percent ranges between 90 weight percent and 99.95 weight percent are included herein and disclosed herein; for example, the first emulsion can be present in the formulation in a range of from 92 to 98 weight percent, from 94 to 98 weight percent, or from 95 to 97 weight percent. The second aqueous emulsion is generally present in the formulation in a range of from 0.05 weight percent to 10 weight percent. Any and all weight percent ranges between 0.05 weight percent and 10 weight percent are included herein and disclosed herein; for example, the second emulsion can be present in the formulation in a range of from 0.1 to 7 weight percent, from 0.5 to 4 weight percent, or from 0.75 to 1.5 weight percent.

To prepare composite panels, a binder and the additive are combined with lignocellulosic materials such as wood fibers, wood flakes, wood strands, wood chips, and wood particles, optionally together with materials such as pulp wood or wastes, wood bark, sawdust, paper, chips and/or cellulose-containing fibers of annual plants (rice shells, straw, flax, reeds, bagasse, corn stalks, and the like), recycled synthetic and natural rubber, recycled wood fiber, waste fibers and other organic substances, including the grinding dust of the boards produced, and mixtures thereof. The lignocellulosic material can be processed prior to use, such as for example, undergoing treatment with hydrogen peroxide, or esterification, or crosslinked using, for example, an aldehyde.

Examples of suitable binders include, but are not limited to isocyanate resins, phenol-formaldehyde-urea resins, phenol-formaldehyde-melamine resins, melamine-urea-phenol-formaldehyde resins, and other urea-formaldehyde and phenol-formaldehyde resin systems commonly used in the manufacture of lignocellulosic composites. Mixtures of any of the above binders can also be used.

Typically, a sufficient amount of the wax formulation is blended with the binder to impart the desired level of water-resistant properties to the final composite panel. The amount of the wax formulation used depends upon the intended use and desired properties for the composite panel. Nonetheless, the amount of wax formulation solids generally does not exceed about 10 weight percent of the total amount of binder used. For example, the wax formulation can be present in an amount in the range of from 0.1 weight percent to 10 weight percent based on solids of the binder/wax formulation.

The binder and wax formulation can be applied to the lignocellulosic material in any suitable manner, such as for example, as atomized drops using a sprayer or spinning disk or by a roll coater. After incorporation, the composite panels can be formed by compression, such as by pressing in single plate presses, continuous presses, special presses for molded particle board parts, or calendar installations, optionally with the simultaneous coating of the boards or moldings in a single step, using veneers, resin impregnated paper, foil, metals, textiles, and the like. Other types of pressing equipment or heating equipment such as radio frequency devices and steam injection presses can be used. Appropriate pressure is applied to the mat to compress to the desired final thickness for a time sufficient to allow the resin to cure and bond the composite. Pressing is generally conducted at high temperatures, for example at 175° C. to 235° C.

Oriented strand board (OSB) is one type of composite that can be manufactured using additives disclosed herein. To produce OSB using the hot press method, lignocellulosic material is combined with a binder and additive in a mixer. The resulting mixture is poured onto a support material to make a pre-form. The pre-form is then placed on a caul plate in a hot press where the finished material is produced by applying pressures above atmospheric and temperatures greater than room temperature. Pressing times vary depending upon the binder used and the temperature applied.

EXAMPLES

The emulsions were prepared as follows: separate wax and water premixes were prepared. The wax premix contained one or more waxes and emulsifiers used in the emulsion. The water premix contained water and additives (if present). The wax and water premixes were heated separately to about 70 to 80° C. After the premixes were heated, the water premix was added to the wax premix and the components were mixed for at least 30 minutes to form a pre-emulsion. The pre-emulsion was then run through a homogenizer at 2000 to 6000 psi to form an emulsion. The emulsion was then cooled to room temperature, after which additives were added to the emulsion.

Comparative Example A

This emulsion was prepared from a wax premix that contained 4.30 grams of a slack wax having a melting point of 140° F.-150° F. (60° C.-65.5° C.), 17.20 grams of a slack wax having a melting point of 110° F.-130° F. (43.3° C.-54.4° C.), 21.50 grams of beef tallow, and 1.575 grams of stearic acid. This premix was added to 54.13 grams of water and 1.297 grams of triethanolamine (85% solution in water).

Comparative Example B

This emulsion was prepared from a slack wax with a melting point between 110° F.-130° F. (43.3° C.-54.4° C.) and an oil content less than 20%. 45.05 grams of this wax and 1.60 grams of stearic acid were added to 52.00 grams of water containing 1.297 grams of triethanolamine and 0.05 grams of a defoamer.

Comparative Example C

This emulsion was a blend of the slack wax used in Comparative Example B and a slack wax with a melting point between 140-150° F. (60° C.-65.5° C.) and an oil content less than 20%. 45.05 grams of this wax blend and 1.60 grams of stearic acid were added to 52.00 grams of water containing 1.297 grams of triethanolamine and 0.05 grams of a defoamer.

Comparative Example D

Wax premix: The wax premix of Comparative Example A, with 10.00 grams of urea, 1.00 gram of acetoacetamide, 0.30 grams borax. This premix was added to 42.83 grams water.

Comparative Example E

Wax premix: The wax premix of Comparative Example A, with 0.25 grams of sorbitan tristearate and 6.00 grams of Ceramer LX-1575 (a 25% dispersion of a maleic anhydride derivative grafted onto a hydrocarbon polymer, available from Baker Hughes). This premix was added to 47.88 grams of water.

Inventive Example 1

95 grams of Comparative Example B were added to 5 grams of Zelan CA-72 (an nonionic/anionic alkyl urethane emulsion available from The Chemours Company).

Inventive Example 2

95 grams of Comparative Example A were added to 5 grams of Zelan CA-72.

The formulations were tested in various boards. Boards were prepared in the following manner: wood particles (Fritz Egger GmbH, Unterradlberg, Austria) with a particle size between 0.63 and 14 mm were airdried to a moisture content of 4.2% and were then added to an IMAL blender. The blender contained one spray nozzle with 527 grams of a urea-formaldehyde binder resin and another spray nozzle with the additive. The additive was added to the wood particles first, followed by the binder. The components were in the blender for about 6 minutes and were then transferred to a container. A 1970 gram quantity of the treated wood particles were placed in a steam hot-press with platen temperatures of about 100 to 300° C. and pressures of about 75 to 250 psi. The pressed wood was then cut into 14 inch (35.5 cm) by 14 inch boards. The boards were allowed to equilibriate to ambient temperature and humidity over 24 hours and were then cut into 6 inch by 6 inch samples. Samples were measured for weight and thickness on each of the four sides and were then placed into a water soak tank at 20°+1-2° C. for 24 hours. Following the 24 hour period, the board samples were removed and measured for weight and thickness gain. Particle board and oriented strand board samples were prepared.

Internal bond strength is the strength of a board to resist rupturing in the direction perpendicular to the plane of the board surface. The internal bond strength was tested for boards prepared with the emulsions of Comparative Examples A and C containing various amounts of Zelan CA-72, and compared to the internal bond strength for a board prepared with Zelan CA-72 alone. The test method used to determine internal bond strength was ASTM D 1037-06a.

The internal bond strength results are shown in Table 1, below.

TABLE 1

Internal Bond Strength

| Sample (weight % Zelan CA-72) | Internal bond (psi) |
|---|---|
| Example A (0%) | 115.04 |
| Example A (0.25%) | 119.17 |
| Example A (1.38%) | 128.48 |
| Example A (2.5%) | 131.25 |
| 100% Zelan CA-72 | 146.62 |
| Example C (0%) | 139.47 |
| Example C (0.25%) | 72.05 |
| Example C (1.38%) | 119.41 |
| Example C (2.5%) | 163.30 |

Thickness swell and percent water absorption were determined by the ASTM D 1037-12 method.

Two tests were ran with particle board and one test was perforated for oriented strand board. The results are shown in Tables 2-4, below.

TABLE 2

Particle Board I Results

| Wax | Density (lb/m$^3$) | % Thickness Swell | % Water Absorption |
|---|---|---|---|
| Comparative Example A | 49.46 | 32.90 | 61.81 |
| Comparative Example D | 49.34 | 39.47 | 83.02 |
| Comparative Example E | 49.50 | 31.93 | 60.09 |
| Example 2 | 48.95 | 20.41 | 38.79 |

TABLE 3

Particle Board II Results

| Wax | Density (lb/m$^3$) | % Thickness Swell | % Water Absorption |
|---|---|---|---|
| Comparative Example A | 50.91 | 26.91 | 43.87 |
| Comparative Example B | 50.89 | 23.20 | 34.86 |
| Comparative Example C | 50.78 | 28.88 | 48.97 |
| Example 1 | 50.85 | 16.96 | 24.79 |
| Example 2 (a) | 50.89 | 23.39 | 36.40 |
| Example 2 (b) | 50.96 | 21.58 | 34.09 |

TABLE 4

Oriented Strand Board Results

| Wax | Density (lb/m$^3$) | % Thickness Swell | % Water Absorption |
|---|---|---|---|
| Comparative Example A | 41.80 | 24.7 | 33.9 |
| Comparative Example B | 41.72 | 25.2 | 32.2 |
| Example 1 | 42.14 | 34.1 | 48.2 |
| Example 2 | 41.90 | 35.0 | 65.4 |

While the present invention has been described and illustrated by reference to particular embodiments and examples, those of ordinary skill in the art will appreciate that the invention lends itself to variations not necessarily illustrated herein.

The invention claimed is:
1. A formulation comprising:
   a) a first aqueous emulsion comprising
      i) a component selected from the group consisting of petroleum wax, a triglyceride, and combinations thereof; and
      ii) a first anionic emulsifier; and
   b) a second aqueous emulsion comprising:
      i) a reaction product of
         I) a derivative of a polyol selected from the group consisting of saccharides, sugar alcohols, sugar acids, gluconic acids, and gluconic acid lactones; and
         II) a polyisocyanate; and
      ii) an emulsifier selected from the group consisting of a second anionic emulsifier, a non-ionic emulsifier, and mixtures thereof.
2. A formulation in accordance with claim 1 wherein the triglyceride is selected from the group consisting of soybean oil, rapeseed oil, sunflower oil, canola oil, safflower oil, menhaden oil, corn oil, olive oil, cacao oil, linseed oil, cottonseed oil, peanut oil, palm oil, jatropha oil, algal oil, castor oil, coconut oil, tallow, fish oil, chicken fat, lard, butter, and combinations thereof.

3. A formulation in accordance with claim 1 wherein the petroleum wax is a slack wax.

4. A formulation in accordance with claim I wherein the first and second anionic emulsifiers are the same or different and are selected from the group consisting of sodium lauryl sulfate, ammonium lauryl sulfate, sodium laureth sulfate, sodium myreth sulfate, sodium stearate, sodium lauryl sarcosinate, perfluorononanoate, perfluorooctanoate, and combinations thereof.

5. A formulation in accordance with claim 1 wherein the polyol is selected from the group consisting of glucose, glyceraldehyde, erythrose, arabinose, ribose, allose, altrose, mannose, xylose, lyxose, gulose, galactose, talose, fructose, ribulose, mannoheptulose, sedoheptulose, threose, erythrito, threitol, glucopyranose, mannopyranose, talopyranose, allopyranose, altropyranose, idopyranose, gulopyranose, glucitol, mannitol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, and combinations thereof.

6. A foimulation in accordance with claim 1 wherein the derivative is an esterification product of the polyol and a composition selected from the group consisting of caprylic acid, capric acid, lauric acid, mysteric acid, palmitic acid, stearic acid, arachidic acid, behenic acid, lignoceric acid, palmitoleic acid, lineolic acid, oleic acid, erucic acid, and combinations thereof.

7. A formulation in accordance with claim 1 wherein the polyisocyanate is selected from the group consisting of diphenylmethane-4,4'-diisocyanate (4,4 MDI), diphenylmethane-2,4'-diisocyanate (2,4 MDI), toluene-2,4-diisocyanate, toluene-2,6-diisocyanate, isophorone diisocyanate, hexamethylene-1,6-diisocyanate, blocked isocyanate, polymeric diphenylmethane diisocyanate (PMDI) and combinations thereof.

8. A formulation in accordance with claim 1 wherein the nonionic emulsifier is selected from the group consisting of fatty alcohol ethoxylates, alkylphenol ethoxylates, fatty acid ethoxylates, ethoxylated fatty esters, ethoxylated amines, fatty acid amines, terminally blocked ethoxylates, fatty acid esters of polyhydroxy compounds, fatty acid esters of sorbitol, fatty acid esters of glycerol, fatty acid esters of sucrose, alkyl polyglucosides, amine oxides, sulfoxides, phosphine oxides, and combinations thereof.

9. A formulation in accordance with claim 1 wherein the first aqueous emulsion is present in a range of from 90 weight percent to 99.95 weight percent and the second aqueous emulstion is present in a range of from 0.05 weight percent to 10 weight percent.

* * * * *